(12) United States Patent
Chawan

(10) Patent No.: US 6,720,312 B2
(45) Date of Patent: Apr. 13, 2004

(54) METHOD FOR CONTROLLING THE MEMBRANE STRUCTURE OF A STARCH GRANULE

(75) Inventor: Dhyaneshwar B. Chawan, Liverpool, NY (US)

(73) Assignee: Heartland Health Solutions, LLC, Brentwood, TN (US)

( * ) Notice: Subject to any disclaimer, the term of this patent is extended or adjusted under 35 U.S.C. 154(b) by 197 days.

(21) Appl. No.: 09/808,826

(22) Filed: Mar. 16, 2001

(65) Prior Publication Data

US 2002/0172743 A1 Nov. 21, 2002

(51) Int. Cl.[7] .................. A61K 31/715; A61K 31/70
(52) U.S. Cl. .................. 514/60; 514/23; 514/58; 426/451; 426/573; 426/575
(58) Field of Search .................. 514/58, 60, 23; 426/557, 451, 573, 575

(56) References Cited

U.S. PATENT DOCUMENTS

| | | |
|---|---|---|
| 5,246,723 A | 9/1993 | Kameyama |
| 5,470,839 A | 11/1995 | Laughlin et al. |
| 5,695,803 A | 12/1997 | Sharp et al. |
| 5,759,607 A | 6/1998 | Chawan et al. |
| 5,776,887 A | 7/1998 | Wibert et al. |
| 5,855,949 A | 1/1999 | McLean |
| 6,022,575 A | 2/2000 | Lee et al. |

*Primary Examiner*—Kevin E. Weddington
(74) *Attorney, Agent, or Firm*—Dennis H. Rainear

(57) ABSTRACT

The invention relates to a method for treating patients with type 2 diabetes using a food composition able to control the release of glucose into the patient's blood. This is achieved by the introduction into the food composition of an additive, such as propylene glycol alginate, which reduces the cooking losses and enhances the starch cell wall membrane to thereby slow the enzymatic hydrolysis of the starch by insulin. The result is a steady state release of glucose and a net reduction in the release of blood glucose (glycemic index) relative to release of glucose observed in a diabetes patient having consumed a food composition without propylene glycol alginate.

3 Claims, No Drawings

METHOD FOR CONTROLLING THE MEMBRANE STRUCTURE OF A STARCH GRANULE

FIELD OF INVENTION

The invention relates to a method for treating patients with type 2 diabetes using a food composition able to control the release of glucose into the patient's blood. This is achieved by the introduction into the food composition of an additive, such as propylene glycol alginate, which reduces the cooking losses and enhances the starch cell wall membrane to thereby slow the enzymatic hydrolysis of the gelatinized starch by insulin. The result is a steady state release of glucose and a net reduction in the release of blood glucose (glycemic index) relative to release of glucose observed in a diabetes patient having consumed a food composition without propylene glycol alginate.

BACKGROUND OF THE INVENTION

In diabetic people either there is insufficient insulin (type 1) or insulin resistance (type 2 non-insulin dependent). In the U.S. alone, 10.3 million were recently reported as type 2 diabetes, mostly adults. Data in the literature suggest highly processed foods and foods high in carbohydrates are some of the causes for the onset of type 2 diabetes.

Type 2 diabetes is the most common form of diabetes. When people eat, their bodies turn the food into glucose (sugar) to use as fuel. In healthy people, insulin helps the glucose get into the cells. In people with type 2 diabetes, glucose builds up in the blood beyond a normal or healthy level. In the absence of low insulin levels (as in diabetic patients) the blood glucose level rises above the safe levels.

Type 2 diabetes mellitus (formerly called non-insulin-dependent diabetes) causes abnormal carbohydrate, lipid and protein metabolism associated with insulin resistance and impaired insulin secretion. However, the effect of diabetes is not limited to carbohydrate metabolism. Lipid and protein metabolism play an important role in the progression of the disease. Abnormal glucose metabolism accounts for poorly regulated biochemical processes that glycosylate hemoglobin and other proteins and lipids throughout the body. The progression of diabetes is caused by numerous metabolic events that occur over a period of years Many studies and treatments exist for type 2 diabetes. U.S. Pat. No. 5,776,887 teaches a diabetic nutritional product having controlled absorption of carbohydrate. The product taught in U.S. Pat. No. 5,776,887 comprises protein, fat, carbohydrate, fiber and disaccharides. No correlation of reduced cooking loss, use of propylene glycol alginate and blood glucose reduction is taught or implied.

U.S. Pat. No. 5,470,839 teaches an enteral diet and method for providing nutrition to a diabetic based on low carbohydrates, high fat, plus protein. No correlation of reduced cooking loss, use of propylene glycol alginate and blood glucose reduction is taught or implied.

U.S. Pat. No. 5,246,723 teaches a food material comprising a farinaceous substance and a fatty acid compound to achieve a slowed absorption of said food material. No correlation of reduced cooking loss, use of propylene glycol alginate and blood glucose reduction is taught or implied.

U.S. Pat. No. 5,855,949 teaches a dietary system high in oil intake using carbohydrates, oil, and hormones to reduce fat storage and stimulate the glucagon-driven pathway. No correlation of reduced cooking loss, use of propylene glycol alginate and blood glucose reduction is taught or implied.

U.S. Pat. No. 5,695,803 teaches nutritional products containing acid treated starches. No correlation of reduced cooking loss, use of propylene glycol alginate and blood glucose reduction is taught or implied.

U.S. Pat. No. 5,759,607 teaches the use of propylene glycol alginate to improve the texture of food compositions, particularly pasta. No correlation of use of propylene glycol alginate and blood glucose reduction is taught or implied.

See also U.S. Pat. No. 6,022,575, which teaches a method to prevent starch retrogradation in pasta products.

Many patents teach and claim pharmaceutical compositions for the treatment of type 2 diabetes. However, some patients suffering with type 2 diabetes do not like to take medicine, or cannot combine certain medicines, or cannot afford such medications. For them, alternative cost effective treatment modalities are needed.

What is needed is a dietary treatment for patients suffering from type 2 diabetes which reduces the glycemic index of foods for said patients. The dietary treatment should supply nutrition to a diabetic patient while substantially reducing said patient's blood glucose level. A dietary treatment for patients with type 2 diabetes which is low in fat and or cholesterol would also be desirable.

SUMMARY OF THE INVENTION

The present invention is directed to a food composition, and a dietary method comprising said composition, for treating patients with type 2 diabetes.

This invention provides a method that controls the glucose release initiated by enzymatic action, said method comprising the step of enterally administering to the patient a meal comprising a blood glucose level reducing amount of a food composition comprising at least 0.01 weight percent propylene glycol alginate. The present invention involves a method for starch cell wall strengthening by inclusion of selected food additives generally regarded as safe (GRASS) in cooked starch-containing food.

Thus, in one embodiment, the present invention is directed to a method for controlling the membrane structure of a starch granule in a food composition during starch hydrolysis by the incorporation into said food composition of an effective amount of PGA or other hydrophilic agent.

In another embodiment of the present invention is presented a method of reducing the glycemic index in a patient suffering type 2 diabetes or abnormally high blood glucose levels, said method comprising the step of including in the diet of said patient a glycemic index reducing amount of a food composition comprising at least 0.01 wgt % of propylene glycol alginate.

The invention further relates to a method of reducing the glycemic index in a patient suffering type 2 diabetes, said method comprising the step of including in the diet of said patient a glycemic index reducing amount of a food composition containing at least 0.01 wgt % of glycerol, sugar alcohol, starch hydrolysate, corn syrup, dextrose syrup, glycerol monostearate, sodium stearoyl lactylate, D-glucose 3-stearate, methyl alpha-D-glucoside 6-stearate, sucrose monostearate, sorbitan tetrastearate, stearoyl-2-lactylate, sodium stearoyl fumarate, polyoxyethylene stearate, and stearyl monoglyceride citrate.

The invention further relates to pasta, or other food composition, which contains propylene glycol alginate for use in the treatment of diabetes.

The invention also relates to the use of propylene glycol alginate in the manufacture of a pasta foodstuff, or other food composition, for use in the treatment of diabetes.

In a preferred embodiment, the food composition of the present invention is a pasta product.

According to the present invention, patients suffering type 2 diabetes or abnormally high blood glucose levels can, in a controlled or steady state manner, reduce their blood sugar level by consuming a meal comprising a starch-containing cereal grain food composition, such as a pasta product, which contains an effective amount of propylene glycol alginate (hereinafter "PGA").

This invention also provides a method for providing nutrition to a diabetic patient while substantially reducing said patient's blood glucose level, said method comprising the step of enterally administering to the patient a meal comprising a blood glucose level reducing amount of a food composition comprising at least 0.01 weight percent propylene glycol alginate.

In addition, the invention provides a method for substantially reducing the blood glucose level in a person, said method comprising the step of enterally administering to the person a food composition prepared by a method comprising;

(a) preparing a food composition consisting of wheat, tapioca, barley, oat, potato, rice or corn flour or mixture thereof, water and at least 0.01 weight percent propylene glycol alginate; and (b) cooking said food composition by placing in boiling water for a time sufficient to increase the percent weight gain due to hydration relative to a comparable food composition without propylene glycol alginate cooked in boiling water.

The PGA-containing food composition products of the present invention have been designed to exhibit reduced cooking losses, an indirect test to confirm the reduction in glycemic index compared to the analogous product without PGA. When starch-containing food is cooked in boiling water, there has long been a problem with a cooking loss of a certain percentage of mass from the food coming out of the food and remaining in the cooking water.

Functionality of PGA is measured herein indirectly as reduction in solids lost in cooking water. This may be attributable to propylene glycol alginate complexation with the starch cell wall membrane, making it elastic thus preventing rupture and release of the gelatinized contents (amylose and amylopectin) of the starch cell. The gelatinized starch cell contents are randomly hydrolyzed to glucose by the digestive enzymes.

It has been discovered in the present invention that by reducing the cooking losses of starchy food containing PGA, a food composition can be produced which, when consumed by a patient suffering type 2 diabetes or abnormally high blood glucose levels, will result in a blood glucose level reduction in said patient, relative to the blood glucose level of a type 2 diabetes patient who has consumed conventional food not containing PGA.

During cooking the starch is 'gelatinized'. This is an essential step that helps enzymes to break down the starch to glucose. Gelatinization of starch particles involves three main steps 1. hydration, 2. swelling, and 3. release of primarily amylose (a straight chain glucose polymer), and amylopectin (a branched chain glucose polymer). The ratio of amylose to amylopectin released can vary depending on the source of the starch, such as corn, rice, oats, barley, tapioca, wheat, etc.

In normally healthy people, the glucose generated by the random enzyme hydrolyses is transported into the muscle across the cell wall by the hormone insulin. Insulin is responsible for maintaining optimum level (70 to 120 milligrams/deciliter) of glucose in blood. It has been discovered in the present invention that by reducing the cooking losses of pasta containing PGA or one or more of certain other hydrophilic agents, a food composition can be produced which, when consumed by a patient suffering type 2 diabetes or abnormally high blood glucose levels, will result in a blood glucose level reduction in said patient, relative to the blood glucose level of a type 2 diabetes patient who has consumed conventional pasta not containing PGA or said hydrophilic agent(s).

It has also been discovered in the present invention that the incorporation of certain hydrophilic agents, such as but not limited to PGA, into a food composition containing starch granules can control the hydrolysis rate of said starch granules. This control on the rate of starch hydrolysis produces a steady state release of glucose over the several hour period following consumption of said food composition. By this manner, the blood glucose levels and/or the glycemic index of the food can be regulated.

DETAILED DESCRIPTION OF THE INVENTION

By "food composition" herein is meant any starch-containing food product, such as but not limited to tapioca, potato, wheat, rice, barley, oat, or corn, or cereal grain (e.g. farinaceous). These can be consumed by the diabetes patient in the form of pasta, noodles, macaroni, spaghetti, rigatoni, ravioli, fettuccini, couscous, pancakes, waffles, breads, pizza, tortillas, taco shells, and the like. Also included as food compositions here are cooked potatoes, breakfast cereals, pastries, rice cakes, dough-wraps and the like.

Cooking losses in starch-containing foods, such as pasta, have been observed for a long time. The loss is seen by the consumer as a cloudy or milky appearance in the boiling water drained off the cooked food. In this cloudy drain water is material extracted from the food. This loss in mass of the cooked food product can be as high as 15 weight percent. The material which is extracted into the boiling water, drained, and thus lost to the consumer is primarily amylose and amylopectin, but also contains vitamins and minerals both natural and exogenous.

It has been discovered in the present invention that the retention of such materials inside the gelatinized (cooked) starch cell of a food composition containing an effective amount of PGA can be extremely beneficial to patients suffering type 2 diabetes who consume said food composition.

The retention of the desirable amylose and amylopectin inside the starch particle of the cooked food, such as pasta, containing PGA, the desirable resistance of the starch cell wall in the cooked food to rupturing, measured as a reduction of cooking losses, can be achieved according to the present invention by means of incorporating the PGA into the food composition before the food composition is cooked, then cooking said food composition.

One preferred method of cooking said food composition is the immersion in boiling water, or exposure to sufficient steam, or microwaving to gelatinize the starch granules in the cells of said food composition.

PGA can readily be incorporated into the food compositions of the present invention by the methods taught in U.S. Pat. No. 5,759,607 the teachings of which are fully incorporated herein by reference.

One feature of the present invention is the ability to make the gelatinized starch in the food composition less accessible for enzyme attack. The presence of PGA in the food is believed to make the starch cell membrane stronger, which minimizes or prevents the rupture or breakdown of the starch cell wall, a large contributor to cooking loss. It is believed, but the inventor does not wish to be limited to the theory that, the PGA present in the food composition of the present invention, lets the starch cell membrane expand to allow the enzyme the enter. The result is the improved control of the enzymatic starch hydrolysis, thereby creating a steady state glucose release into the blood. This has the effect of reducing the glycemic index of the food which the patient is consuming.

As a result of this invention, patients suffering type 2 diabetes or abnormally high blood glucose levels who consume food compositions of this invention can have their insulin treatments reduced or be removed from insulin dependence because the food compositions of the present invention when consumed achieve the controlled starch hydrolysis for steady state glucose release.

Thus the invention further relates to a meal for a person with type 2 diabetes or an abnormally high blood glucose level comprising a food selected from the group consisting of wheat, oat, barley, tapioca, potato, rice or corn and an amount of propylene glycol alginate equal to or greater than 0.01 weight percent of said food.

EXPERIMENTAL

Cholesterol-free Product and Recipe

Product Preparation Procedure

| Ingredients | | |
|---|---|---|
| Sliced Onions/Mixed Vegetables | One Cup | 160 grams |
| Chopped Ginger | One tsp | 4 grams |
| Chopped Hot Green Peppers | One tsp | 3.5 grams |
| Salt | One tsp | 7 grams |
| Oil (Canola or Olive oil) | Two TBS | 22 grams |
| Black Mustard Seed | ¼ tsp | 1 gram |
| Urad Dal (Lentil) | One tsp | 5 grams |
| Water | Two cups | 500 grams |
| (plus flavor if desired) | | |
| Couscous-like Durum wheat product | | 125 grams |

Procedure

In a two-quart saucepan heat the oil (or butter or margarine). Add black mustard seed & wait until crackles. Add Urad dal and let brown lightly. Wait until mustard 'crackles'. Add onions and sauté until onions are softened/transparent (when veggies are used no sautéing is needed). Add salt. Add water. Mix well and bring the contents to boil. Shut-off the heat. Add the couscous-like product. Mix well until all the water is absorbed. Cover the pan with its lid and set aside for three minutes. Sprinkle with chopped fresh Cilantro if desired and serve.

Test Method to Determine PGA (Propylene Glycol Alginate) & Protein/Starch Complexing Efficiency in the 'Regrind' from Pasta "Scrap"

Equipment & Reagents

1. Electric Kettle to boil the water.
2. Balance (0.01 g Sensitivity).
3. Distilled Water.
4. Sample Weighing boats.
5. Beakers (250 ml).
6. Glass mixing rods.
7. Mini sieves (150 mesh) to collect and weigh gelatinized/cooked 'regrind'.
8. Infrared Moisture Balance and tongs to handle sample dishes.
9. Timer (minutes/seconds)

Procedure

Mill the pasta regrind/scrap and sift using the standard sieves.

Weigh 10.00 grams regrind sample in to a clean 250 ml beaker.

In the electric kettle heat the distilled water and bring to boil.

Pour the boiling water on to the regrind in the beaker to the 100 ml mark and mix well with glass rod.

Start the three minute timer.

Mix the contents every 30 seconds to facilitate hydration/cooking (gelatinization)

At the end of three minutes, mix and pour the contents into the weighed sieve and collect the water in a clean/dry beaker.

Let water drain for 3 minutes.

Weigh the sieve containing cooked pasta product and beaker containing drained water and record the weights.

Calculate % yield.

Analyze % solids in the drained water using the Moisture Balance.

Calculate weight % cooking loss.

In the following experiment, pasta food compositions were prepared containing 0.03 weight percent PGA in the Invention samples, and no PGA in the Control samples. The cooking losses were measured and averaged over two trials and reported as the % Solids Loss. The following pasta products, made from semolina, were ground and sized to the same granulation as that of commercial "Cream of Wheat", and then cooked and measured for cooking loss as described above.

Invention=7.00 wgt. % Solids Loss

Control=9.68 wgt. % Solids Loss

CoW=15.66 wgt. % loss (This is commercially available 'Cream of Wheat'—Quick Cooking)

Blood Sugar Testing

Effect of PGA-containing food on Blood Glucose Levels in a Type 2 Diabetic Patient: (average of two tests)

TABLE 1

| BLOOD GLUCOSE, in mg/dL-finger prick test | | | | |
|---|---|---|---|---|
| Hours after Meal | Invention | Control | +/− | % |
| 0 | 104 | 95 | +9 | +9.47 |
| 1 | 226 | 267 | −41 | −15.36 |
| 3 | 118 | 195 | −77 | −39.49 |
| 5 | 61 | 93 | −32 | −34.4 |

The patient consumed the same mass (420 grams) of cooked (as described above) pasta product with PGA (Invention) and without PGA (Control). On each test day (four different days) the patient was overnight fasting. Blood glucose determination was made before the meal (breakfast) each day. This was a double crossover study, i.e., invention meal one day and control meal the next day and repeated this order for the third and fourth days. No other items such as sauce, side dishes, coffee or tea were consumed for the entire 5-hour test periods.

The data in Table 1 were obtained using the ACCU CHECK, Instant GLUCOMETER. This is manufactured in Germany by Boehringer Maneheim, GmbH for Roche Diagnostics, Boehringer Maneheim Corporation, Indianapolis, Ind. 46250. The procedure for determining the glucose in the blood using this GLUCOMETER was as follows:

1. Calibrate the instrument using the standard calibration strip that comes with the instrument.
2. Insert the test strip following the direction.
3. Clean/Wash hands with soap, wipe dry.
4. Wipe the fingertip with alcohol pad to disinfect.
5. Using the 'lancet' that comes with instrument prick the tip of the sterilized finger.
6. Transfer drop of the blood on to the testing part of the strip as per the directions.
7. Press start button.
8. The analysis starts as indicated by the count down timer (60 seconds).
9. At the end of 60 seconds digital read flashes on the display screen. Number shown is mg Glucose per Deci-Liter (mg/DL)

These are universally accepted units of blood glucose measurements. In healthy (non-diabetic) individuals, the blood glucose is around 110 mg/DL.

A review of the results in Table 1 illustrates that the inventive food composition resulting from the reduced cooking losses of pasta containing PGA produced significantly lower blood glucose levels in the type 2 diabetes patient at 1 hour, 3 hour and 5 hour tests relative to the blood glucose levels at the same time periods for a type 2 diabetes patient who had consumed conventional (high cooking loss) pasta without PGA. This occurred despite the fact that the initial blood glucose readings (in mg/dl) at time zero showed a higher value (104 mg/dl) for the patient who consumed the Inventive pasta than the value (95 mg/dl) for the patient who consumed the Control pasta.

Thus, there is provided by the present invention a food composition useful in a dietary treatment of patients with type 2 diabetes whereby the blood glucose levels can be reduced relative to blood glucose levels in a type 2 diabetes patient not exposed to the present invention.

Also presented is a method of reducing the glycemic index in a patient suffering type 2 diabetes, said method comprising the steps of including in the diet of said patient a glycemic index reducing amount of a PGA-containing food composition with reduced cooking losses relative to conventional food composition without PGA.

Cooking losses in pasta can be reduced according to the present invention by reducing the cooking loss after being cooked in boiling water comprising the steps (a) preparing a pasta dough consisting of wheat flour, water and from 0.01 to about 2.0 weight percent propylene glycol alginate; (b) cooking said pasta by placing in boiling water for a time sufficient to increase the percent weight gain due to hydration relative to pasta without propylene glycol alginate cooked in boiling water. The pasta dough can be optionally shaped and dried to form a pasta after step (a) and before step (b).

A "glycemic index reducing amount" of PGA in the present invention is an amount equal to or greater than about 0.01 wgt % PGA in the food composition. No upper limit on the amount of PGA is established according to the present invention but an amount exceeding about 2.0 wgt % may become less desirable based on cost, texture, mouth feel, flavor alteration or other consumer preferences.

Thus, a preferred amount of PGA in pasta is from about 0.01 to about 2.0 wgt %, and a more preferred amount is from 0.35 to 1.25 wgt % PGA in the pasta. Preferred amounts in other starch-containing food compositions, such as rice, corn, etc can vary but are readily determined without undue experimentation. The amount of PGA or other hydrophilic agent herein useful in the present invention will vary with the source of the starch. Cornstarch granules are very small compared to potato starch granules. Starch granules can vary from 2 microns to 100 microns. Small diameter starch granules will generally require more PGA or other agent in the present invention because they have more surface area and thus require more PGA per unit mass.

Similarly, "a glycemic index reducing amount of a food composition" herein means any amount of a food composition containing any amount of an agent selected from the group consisting of propylene glycol alginate, glycerol monostearate, sodium stearoyl lactylate, D-glucose 3-stearate, methyl alpha-D-glucoside 6-stearate, sucrose monostearate, sorbitan tetrastearate, stearoyl-2-lactylate, sodium stearoyl fumarate, polyoxyethylene stearate, and stearyl monoglyceride citrate sufficient to reduce the glycemic index of a type 2 diabetes patient or a person exhibiting abnormally high blood glucose levels.

The PGA is believed to act as a hydrophilic agent in the process of treating the starch. Alternative hydrophilic agents useful in the present invention can be selected from the group consisting of glycerol, sugar alcohol, starch hydrolysate, corn syrup, dextrose syrup, glycerol monostearate, sodium stearoyl lactylate, D-glucose 3-stearate, methyl alpha-D-glucoside 6-stearate, sucrose monostearate, sorbitan tetrastearate, stearoyl-2-lactylate, sodium stearoyl fumarate, polyoxyethylene stearate, and stearyl monoglyceride citrate and the like to prevent starch retrogradation in the cooked pasta product.

That which is claimed is:

1. A method for controlling the membrane structure of a starch granule in a food composition during starch hydrolysis following consumption of said food composition, said method comprising the incorporation into said food composition of an effective amount of an agent selected from the group consisting of glycerol, sugar alcohol, starch hydrolysate, corn syrup, dextrose syrup, propylene glycol alginate, glycerol monostearate, sodium stearoyl lactylate, D-glucose 3-stearate, methyl alpha-D-glucoside 6-stearate, sucrose monostearate, sorbitan tetrastearate, stearoyl-2-lactylate, sodium stearoyl fumarate, polyoxyethylene stearate, and stearyl monoglyceride citrate.

2. The method of claim 1 wherein the agent is selected from the group consisting of propylene glycol alginate, glycerol monostearate, sodium stearoyl lactylate, D-glucose 3-stearate, methyl alpha-D-glucoside 6-stearate, sucrose monostearate, sorbitan tetrastearate, stearoyl-2-lactylate, sodium stearoyl fumarate, polyoxyethylene stearate, and stearyl monoglyceride citrate.

3. A method for starch cell wall strengthening in a starch-containing food by inclusion in said food of at least one food additive selected from the group consisting of glycerol, sugar alcohol, starch hydrolysate, corn syrup, dextrose syrup, propylene glycol alginate, glycerol monostearate, sodium stearoyl lactylate, D-glucose 3-stearate, methyl alpha-D-glucoside 6-stearate, sucrose monostearate, sorbitan tetrastearate, stearoyl-2-lactylate, sodium stearoyl fumarate, polyoxyethylene stearate, and stearyl monoglyceride citrate in an amount equal to or greater than 0.01 weight percent of said starch-containing food.

* * * * *